United States Patent
Wells

(10) Patent No.: US 7,817,716 B2
(45) Date of Patent: Oct. 19, 2010

(54) METHOD AND/OR APPARATUS FOR ANALYZING THE CONTENT OF A SURVEILLANCE IMAGE

(75) Inventor: Aaron G. Wells, Oakland, CA (US)

(73) Assignee: LSI Corporation, Milpitas, CA (US)

( * ) Notice: Subject to any disclaimer, the term of this patent is extended or adjusted under 35 U.S.C. 154(b) by 1080 days.

(21) Appl. No.: 10/447,739

(22) Filed: May 29, 2003

(65) Prior Publication Data

US 2004/0240546 A1    Dec. 2, 2004

(51) Int. Cl.
*H04N 7/12* (2006.01)
*H04N 11/02* (2006.01)

(52) U.S. Cl. .............................. 375/240.01; 375/240.26

(58) Field of Classification Search .................................
375/240.01–240.06, 240.12–240.16, 240.26; 348/143–169
See application file for complete search history.

(56) References Cited

U.S. PATENT DOCUMENTS

| | | | |
|---|---|---|---|
| 5,917,958 A * | 6/1999 | Nunally et al. ............... | 382/276 |
| 5,996,023 A * | 11/1999 | Winter et al. ............... | 709/253 |
| 6,031,573 A * | 2/2000 | MacCormack et al. . | 375/240.16 |
| 6,097,429 A * | 8/2000 | Seeley et al. ................. | 348/154 |
| 6,298,482 B1 * | 10/2001 | Seidman et al. .............. | 725/101 |
| 6,496,228 B1 * | 12/2002 | McGee et al. ................ | 348/700 |
| 6,563,532 B1 * | 5/2003 | Strub et al. .................. | 348/158 |
| 6,813,312 B2 * | 11/2004 | Tullberg et al. ......... | 375/240.01 |
| 6,970,183 B1 * | 11/2005 | Monroe ....................... | 348/143 |
| 6,999,613 B2 * | 2/2006 | Colmenarez et al. ........ | 382/156 |
| 7,023,913 B1 * | 4/2006 | Monroe .................. | 375/240.01 |
| 7,239,662 B2 * | 7/2007 | Horowitz et al. ........ | 375/240.24 |

* cited by examiner

*Primary Examiner*—David Czekaj
(74) *Attorney, Agent, or Firm*—Christopher P. Maiorana, PC

(57) ABSTRACT

An apparatus comprising an input circuit, a content analyzer, a storage circuit and an output circuit. The input circuit may be configured to generate a first intermediate signal from a plurality of input video signals. The content analyzer circuit may be configured to present one or more flags in response to the intermediate signal. The storage circuit may be configured to (i) store and organize the first intermediate signal into a plurality of sequences each related to one of the input video signals and (ii) generate a second intermediate signal from the sequences. The output circuit may be configured to generate an output video signal in response to the second intermediate signal. The output circuit may be configured to embed tracking information into the output video signal in response to the one or more flags.

40 Claims, 8 Drawing Sheets

METHOD AND/OR APPARATUS FOR ANALYZING THE CONTENT OF A SURVEILLANCE IMAGE

FIELD OF THE INVENTION

The present invention relates to surveillance imaging generally and, more particularly, to a method and/or apparatus for analyzing the content of a surveillance image.

BACKGROUND OF THE INVENTION

Conventional surveillance systems typically implement multiple cameras to monitor a site. The systems are often archived to tape or other storage media for future reference. Archiving typically uses a continuous operation and generates large amounts of video data. Storing, monitoring, retrieving, and analyzing such large volumes of stored video data presents challenges to conventional storage systems. Video compression, and more specifically motion-compensated video compression, such as the system described in co-pending application U.S. Ser. No. 10/389,314, entitled MULTI-CHANNEL VIDEO COMPRESSION SYSTEM, which is hereby incorporated by reference in its entirety, may be used to reduce the processing overhead of video monitoring systems.

It would be desirable to implement image processing functions to improve the volume of storage, accuracy of monitoring, and/or ease of retrieval and analysis of archived video content.

SUMMARY OF THE INVENTION

The present invention concerns an apparatus comprising an input circuit, a content analyzer, a storage circuit and an output circuit. The input circuit may be configured to generate a first intermediate signal from a plurality of input video signals. The content analyzer circuit may be configured to present one or more flags in response to the intermediate signal. The storage circuit may be configured to (i) store and organize the first intermediate signal into a plurality of sequences each related to one of the input video signals and (ii) generate a second intermediate signal from the sequences. The output circuit may be configured to generate an output video signal in response to the second intermediate signal. The output circuit may be configured to embed tracking information into the output video signal in response to the one or more flags.

The objects, features and advantages of the present invention include providing a method and/or apparatus for implementing video surveillance that may (i) analyze the content of a surveillance image, (ii) provide efficient implementation of a combined content analyzer and video encoder, and/or (iii) implement an encoder system that may provide (a) spatial and temporal filtering, (b) spatial and temporal analysis, (c) motion estimation, (d) motion compensation, (e) video capture and/or (f) storage subsystems that may be used by a content analyzer.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide content analysis that may be integrated in the acquisition side of a surveillance system (e.g., during recording, either with or without encoding), the retrieval side of a surveillance system (e.g., during playback) or in both the acquisition and retrieval sides. Factors such as system hardware, installation, labor costs, regulatory or legal restrictions, and goals and value of the surveillance content may influence whether all of the systems or individual systems described are implemented.

The present invention improves upon conventional approaches by implementing content analysis in the acquisition side of the system. The volume of data recorded can be reduced by identifying and eliminating "uninteresting" content. An example of uninteresting content may be long periods of time where nothing changes in the image being recorded. Similarly, monitoring accuracy may be improved by identifying "alert" conditions, calling attention to "interesting" (or potentially interesting) content. Interesting content may be defined as the portion of a stored data where a monitoring attendant should determine if an action is needed. Calling attention to interesting content may be of particular significance when the attendant is unmotivated, distracted, busy, bored, or for some other reason inattentive. System hardware may be implemented more efficiently and accurately by responding to periods and regions of interest or indifference to improve accuracy (either temporal or spatial) of acquisition. Also, interesting features may be tracked within the acquired content. Control or informational signals may be presented to external systems.

On the playback side, large volumes of acquired data can be quickly navigated through to locate regions of interest for display, transmission, and/or subsequent analysis. The benefits of playback acquisition is that all data is acquired without discarding data before storage. The parameters or rules for determining what is deemed interesting content may be set at playback. The present invention may implement either or both of record content analysis and playback content, analysis. When the analysis accompanies a system with an encoder, additional implementation efficiency may result. In particular, image and motion analysis and storage systems of an encoder may be adapted to provide content analysis. Such encoding may be implemented without additional system complexity and cost.

Figure 1:
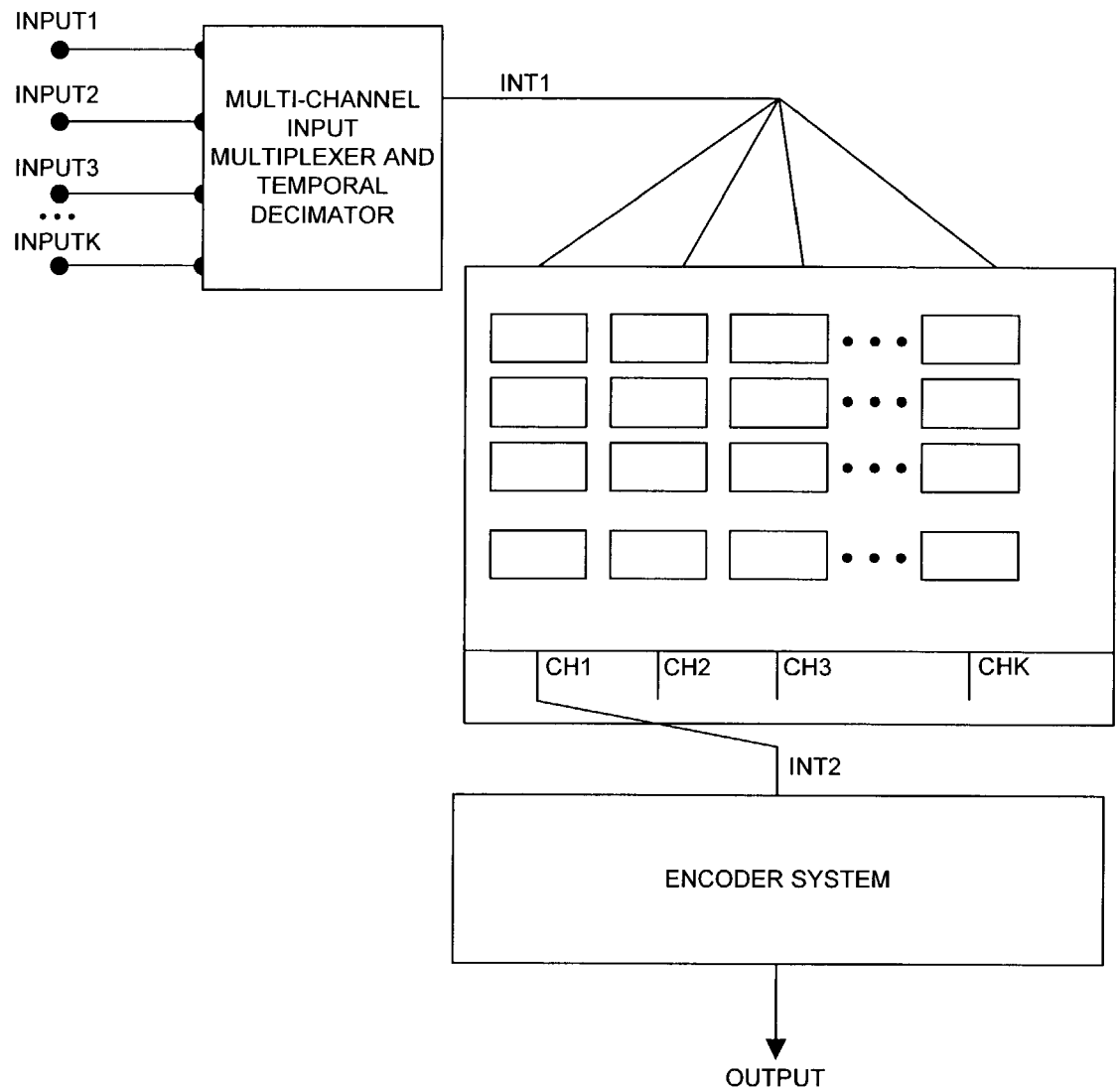
FIG. 1 is a block diagram of a multi-channel encoder system.
Figure 2:
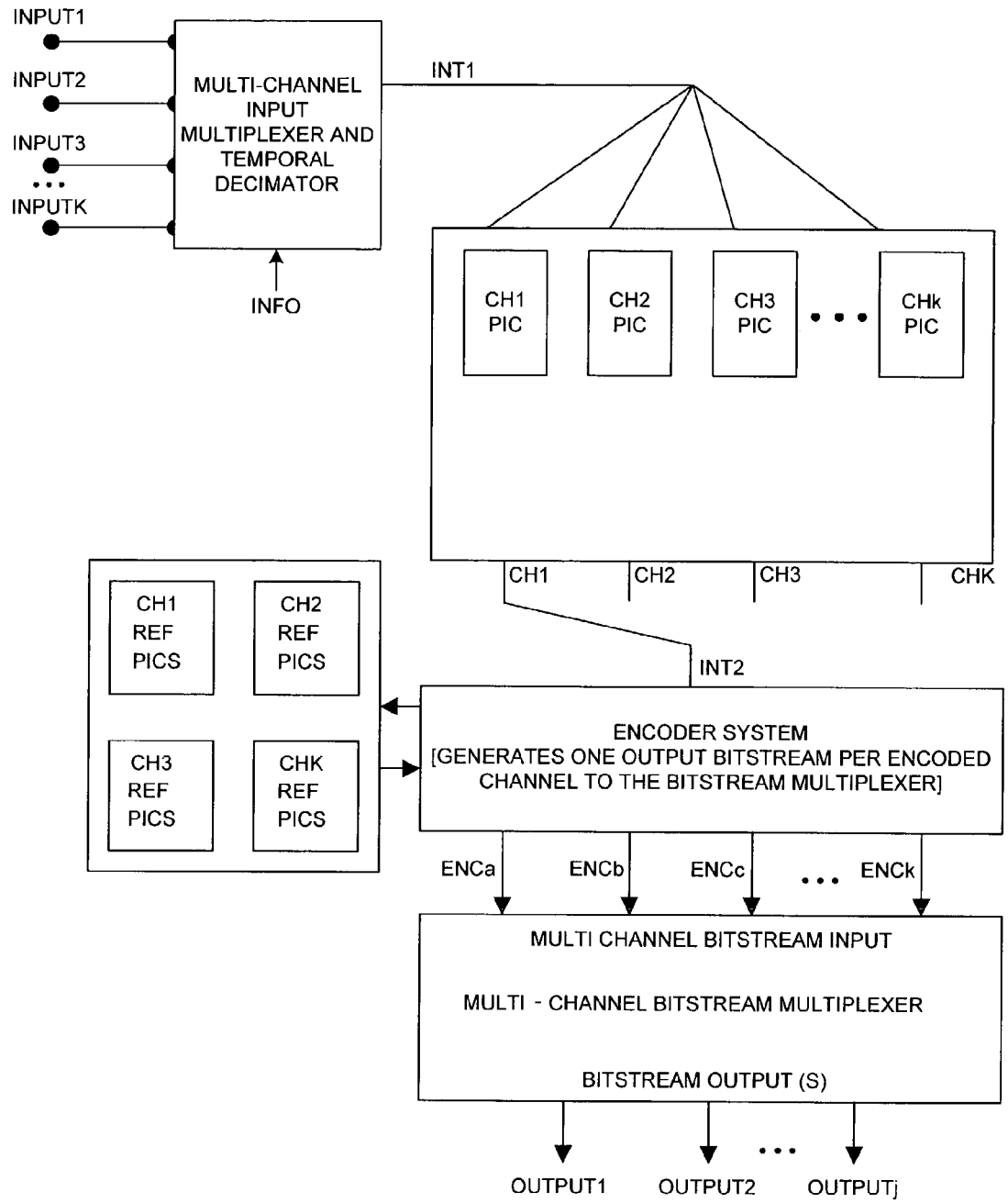
FIG. 2 is a block diagram of a multi-channel encoder system.

FIG. 1 and FIG. 2 illustrate multi-channel encoder systems without content analyzers. Such systems may be useful for single channel systems, in which case the multi-channel input multiplexer would be a simple video capture module. The encoder systems of FIG. 1 and FIG. 2 are described in co-pending application U.S. Ser. No. 10/389,314, entitled MULTI-CHANNEL VIDEO COMPRESSION SYSTEM, which is hereby incorporated by reference.

Figure 3:
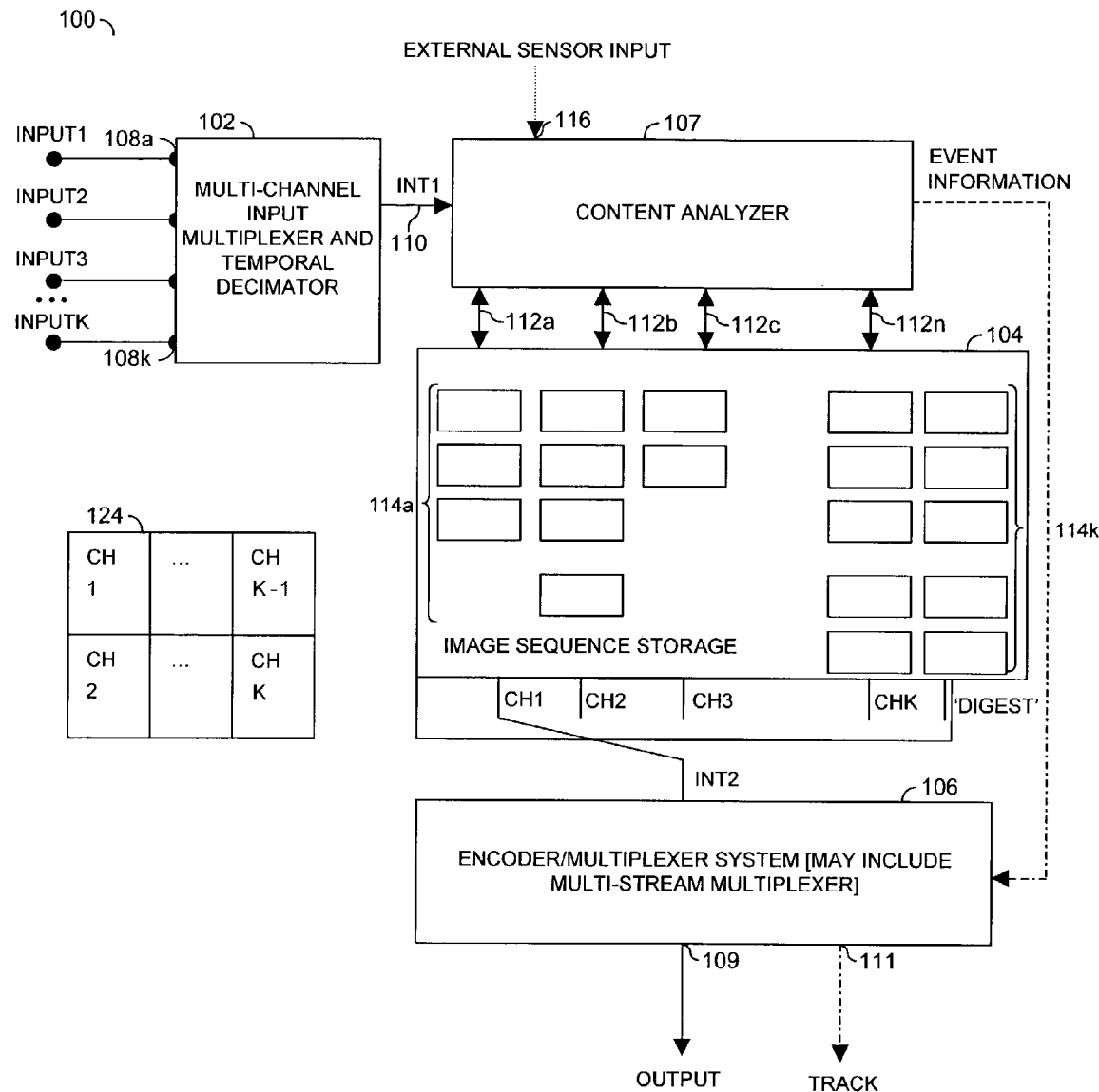
FIG. 3 is a block diagram of a multi-channel encoder system implementing content analysis in an intelligent image pre-processor.

Referring to FIG. 3, an example of a system 100 illustrating an embodiment of the present invention is shown. The system 100 illustrates a multi-channel encoder system with content analysis in an intelligent image pre-processor is shown. The system 100 illustrates an example implementation that builds on the design illustration in FIG. 1. However, the system 100 may also be built on the system of FIG. 2.

The system 100 generally comprises an input section (or circuit) 102, a storage section (or circuit) 104, an output section (or circuit) 106, and a content analyzer block (or circuit) 107. The system 100 may receive multiple signals (e.g., INPUT1-INPUTk, where k in an integer) at interfaces 108a-108k, respectively. The system 100 may have an output 109 that may generate a signal (e.g. OUTPUT). The signal OUTPUT may be a bitstream. The system 100 may also have an output 111 that may generate a signal (e.g., TRACK). The signal TRACK may include event information.

The content analyzer 107 may present image sequences to the data storage unit 104 through a number of busses 112a-112n. The content analyzer may also present event information at an output 114. The content analyzer 107 may receive a signal (e.g., INT) from the circuit 102. The content analyzer may also have an input 116 that may receive an optional external input (or sensor) signal.

The input section 102 may be implemented as a multi-channel input multiplexer and temporal decimator. Each of the inputs 108a-108k generally receives one of the input signals INPUT1-INPUTk, sometimes referred to as channels or bitstreams. Each input signal INPUT1-INPUTk may be implemented as a video signal. The input video signals INPUT1-INPUTk may each have a similar video format or have different video formats. The input section 102 may multiplex the input video signals INPUT1-INPUTk onto a video line 110 as the intermediate signal INT1. The intermediate signal INT1 may be implemented in a standard video format. Multiplexing operations within the input section 102 may be provided by a variety of methods as described in the previously referenced co-pending application.

The storage section 104 may be implemented as a memory device. For example, the storage section 104 may be implemented as a computer hard disk drive, a memory device, or other appropriate memory. The memory section 104 may be configured to organize pictures received via the intermediate signal INT1 into separate sequences 114a-114k (where k is an integer), one sequence for each of the input channel video signals INPUT1-INPUTk. The storage section 104 may generate an intermediate signal (e.g., INT2). The intermediate signal INT2 may incorporate picture data from each of the sequences 112a-112k. The intermediate signal INT2 may be implemented in a standard video format suitable for compression by the output section 106.

A storage capacity for each sequence 114a-114k may be based upon one or more parameters associated with the respective input video signal INPUT1-INPUTk. For example, similar memory space may be allocated to buffer each of the sequences 114a-114k where each of the input video signals INPUT1-INPUTk have similar resolutions, frame rates, and priorities. In another example, larger storage capacity may be allocated to a particular channel where the associated input video signal INPUT has a higher resolution, higher frame rate and/or higher priority than the other input video signals INPUT1-INPUTk.

The output section 106 may be implemented as an encoder configured to encode and/or compress a set of pictures (e.g., an MPEG2 group of pictures (GOP)) from each of the sequences 114a-114k within the intermediate signal INT2. The resulting encoded and/or compressed signal may be presented as the output video signal OUTPUT. The output section 106 may be operational to encode/compress the sequences 114a-114k in a rotating pattern. For example, the output section 106 may compress some or all of the first sequence 114a, then some or all of the second sequence 114b, then some or all of the third sequence 114c, and so on. After operating on the final sequence 114k, the output section 106 may wrap around and operate on the first sequence 114a. Other orderings for encoding/compression may be implemented to meet the criteria of a particular application.

In one embodiment, the output section 106 may group pictures within a particular sequence 114 separately from all the pictures in all other sequences 114a-114k. The pictures within each of the sequences 114a-114k may be compressed with references only to other pictures in the same sequence 114a-114k. Illustratively, an output section 106 implementing an MPEG2 encoder may compress the pictures from each input video signal INPUT1-INPUTk as separate closed groups of pictures. Therefore, long periods of low or no-motion video may be captured and motion compensated compression schemes (e.g., MPEG1, MPEG2, MPEG4, H.261, H.263, H.264, etc.) may be applied to achieve extremely efficient compressions. In the above example, the output section 106 may have groups of pictures of different lengths or structure depending on the temporal decimation ratio and/or other application criteria. The system 100 may also include an image compositor 124 (for generating a digest or Picture in Picture (PIP) stream for viewing multiple channels simultaneously) and/or an image decimator.

In one example, the content analyzer 107 may be incorporated in the output circuit 106. The content analyzer 107 processes the incoming images by performing both spatial and temporal analysis noted by the bi-directional arrows between the content analyzer 107 and the memory section 104. The system 100 is shown illustrating fewer pictures in the queues for channels CH1 and CH3. The content analyzer 107 has suppressed images judged uninteresting for a particular implementation. The different frame rates on the different channels CH1-CHK may also result from the configuration of the input multiplexer system 102 (e.g., not exclusively from the result of content analysis). Typically these will be images that have zero (or sufficiently low) change relative to the prior encoded image. Consequently there is insufficient new information to warrant encoding the repeated image and consuming channel bandwidth or storage capacity. The system 100 also optionally provides a minimum encoding update rate (e.g., encoding a minimum number of pictures per unit of time) to demonstrate that the system 100 is functioning properly during extended periods of uninteresting video.

The channel CHK, on the other hand, illustrates a queue with more pictures than some of the other channels. The content analyzer 107 has identified content of greater interest and has increased the image-encoding rate on the channel CHK to provide greater temporal resolution during periods of interest. The system can optionally generate one or more digest streams 122a-122k of a digest picture 124. The digest picture 124 may be presented for viewing while the sequences 114a-114k may be stored. The digest picture 124 may have a border of channel K highlighted, under control from the content analyzer 107 and user configuration rules. An example of an alert may be accomplished in any one of a variety of ways and combinations. For example, an alert may be generated as an audio alert, a test message, a highlighted picture in picture (PIP) stream. Furthermore, such an alert may be used to (i) move a stream of interest to the front of a video picture, (ii)

display a full resolution image sequence, (iii) generate a message to present to system, and/or (iv) control the start, stop, pause or resume of the recording.

An event log (e.g., EVENT INFORMATION) may be transmitted along with the video. The EVENT INFORMATION may be either encoded directly into the bitstream or as a separate data stream within a multi-channel multiplexer 102. In one example, the EVENT INFORMATION may be stored locally, while the image sequences 114a-114k may be stored remotely. The EVENT INFORMATION may be transmitted as one or more flags. The EVENT INFORMATION assists operators in navigating directly to periods of interest when viewing and analyzing archived material. The EVENT INFORMATION may be implemented as index data that may be stored separately from the archived video through the signal TRACK presented at the output 111. In particular, if the archiving device is non-random access (e.g., a tape device), having an event log stored to a random access device (e.g., a hard disk drive or memory) may increase productivity when navigating through the archive. The event information is typically augmented by the encoder and multiplexer system 106 to embed additional navigation information (e.g., intra picture location) which the content analyzer 107 does not have available. Additionally, within the archiving system, the event log may be augmented with storage-related navigation information, such as file name, location, and offset within the file. An offset may include a logical block number, a sector, cylinder, head or drive, a physical position on a tape, or other placement indicator use by a storage device. Standard log information (e.g., date and time, source number, etc.) may also be implemented to meet the design criteria of a particular implementation.

Figure 4:
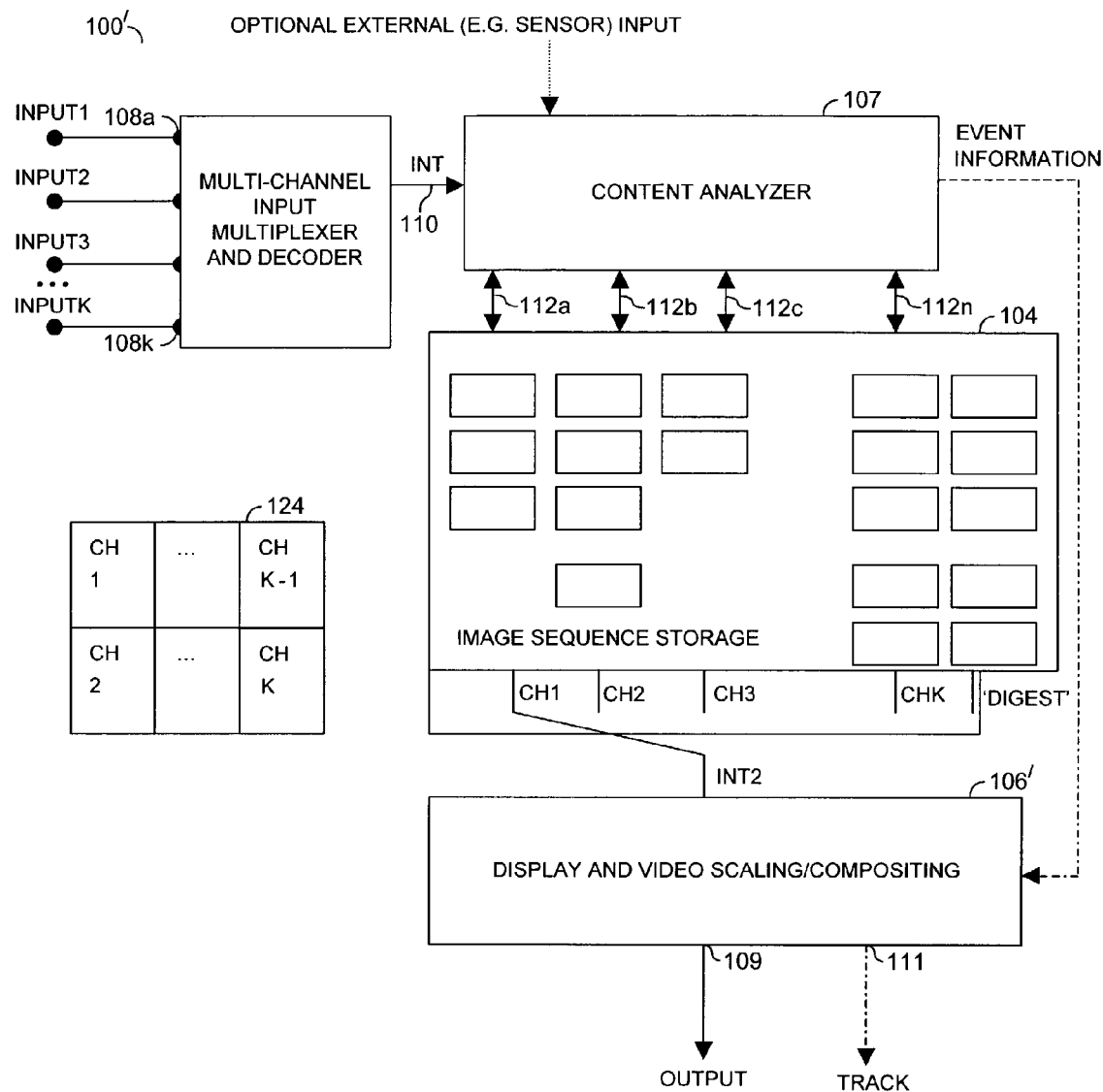
FIG. 4 is a block diagram of a system illustrating a content analyzer implementation in a decoder.

Referring to FIG. 4, an alternate system 100' is shown. The system 100' illustrates a multi-channel decoder system with an intelligent content analyzer. The circuit 106' may be implemented as a display and video scaling/compositing circuit. The solid output line labeled OUTPUT may be used for video for monitoring. The dashed output line labeled TRACK may provide event information. The content analyzer 107 may be located in the decoder 102. The system 100' addresses the case where it is desirable (e.g., for cost, system simplicity, commercial, safety or regulatory reasons) to perform analysis at the downstream or receiving side of the system. In this case, the content analyzer may be in the monitoring site. The analysis may be used to provide alerts to attendants or other automated equipment. Alternatively, the analysis may be used at an archival site. An event log may be generated in real time as the streams come in. The analysis may be employed during subsequent analysis to assist as a filter to get through the large amount of recorded material. In this latter case, the system 100' may be configured to specifically look for certain combinations of events. For example, motion in a certain region of a given camera at night (e.g., period of relative darkness) may be used. In the scenario described, the system 100' may perform the same processing after decoding as the encoder system 100 of FIG. 3 performed prior to encoding.

Figure 5:
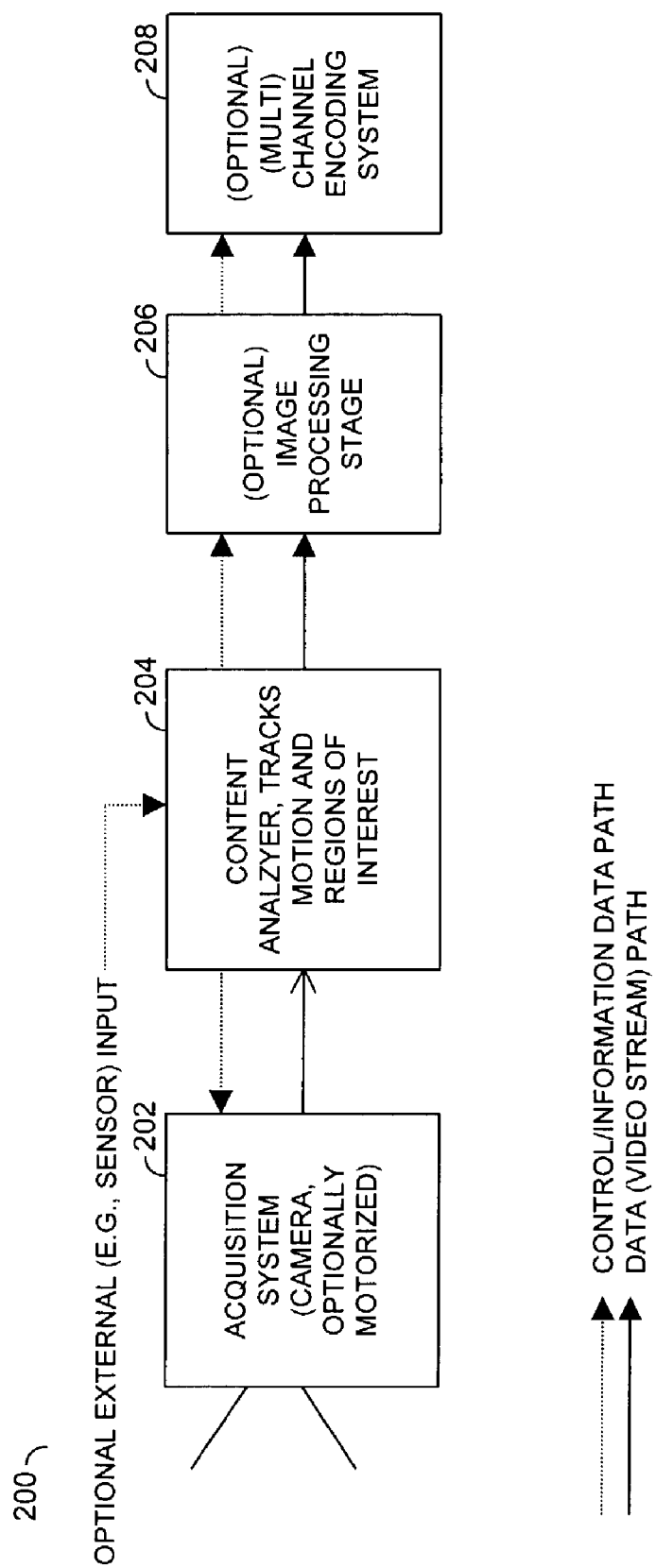
FIG. 5 is a diagram illustrating the data flow of the present invention.

Referring to FIG. 5, a process 200 is shown. The process 200 may illustrate content analysis and identification of spatial regions of interest. The process 200 generally comprises an acquisition block (or module) 202, a content analyzer block (or module) 204, an optional processing block (or module) 206, and an optional encoding block (or module) 208. The encoding block 208 may be implemented as a multi-channel encoding block. The content analysis may be implemented either separately or in conjunction with the identification of temporal regions of interest described. The content analyzer block 204 generally identifies a region of interest (e.g., a car moving in a parking lot). The region of interest is generally conveyed to the image processing module 206. The image processing module 206 may implement digital zoom or image enhancement such as brightness, contrast, or edge enhancement occurs.

The image processing module 206 may also track the motion of regions of interest. Such tracking may be used either (i) in conjunction with the processing described above and/or (ii) in order to provide information or control signals to external devices. For example, if the acquisition block 202 has a motorized mount and can be steered, control information or signals may be provided to improve the acquired source signal provided to the encoder. Some of the parameters that may be controlled by the acquisition device 202 include controls the camera (e.g., zooms in or out, or changes brightness, contrast, or edge enhancement settings as desired) or to acquire the region of interest with better temporal and/or spatial resolution. Such analysis may be applied to one or more channels within the system either independently or simultaneously. For example, a single camera in a retail environment (e.g., a store) may be positioned to maintain a wide focus during general operations. If motion is detected near a point of interest (e.g., the cash register), the system 200 may be configured to change focus (e.g., either with or without motorized camera mounts, as dictated by cost and location) to acquire the immediate vicinity of the register with greater resolution.

The content analysis and actions described may be performed in a variety of ways. For example, content analysis may be performed on uncompressed video (e.g., for alert and event log generation information), even in the case where no video compression is performed. The acquisition features may be implemented in the context of the system 100 of FIG. 3, but without the encoder in the output portion 106.

Furthermore, an input multiplexer (as in FIG. 1) could be inserted between the camera and content analyzer for the handling of multiple inputs. The dotted line showing control of the camera by the content analyzer 204 applies to controllable acquisition systems and may not be needed for all implementations. The image processing stage 206 is optional and may not be used in all embodiments. In the image processing stage 206, digital crop and zoom could occur, as well as other processing such as brightness, contrast, and edge enhancement. The block 208 may transmit uncompressed video or include a multi-channel encoder system with multiple outputs to multiple destinations (as described in FIG. 7).

Figure 6:
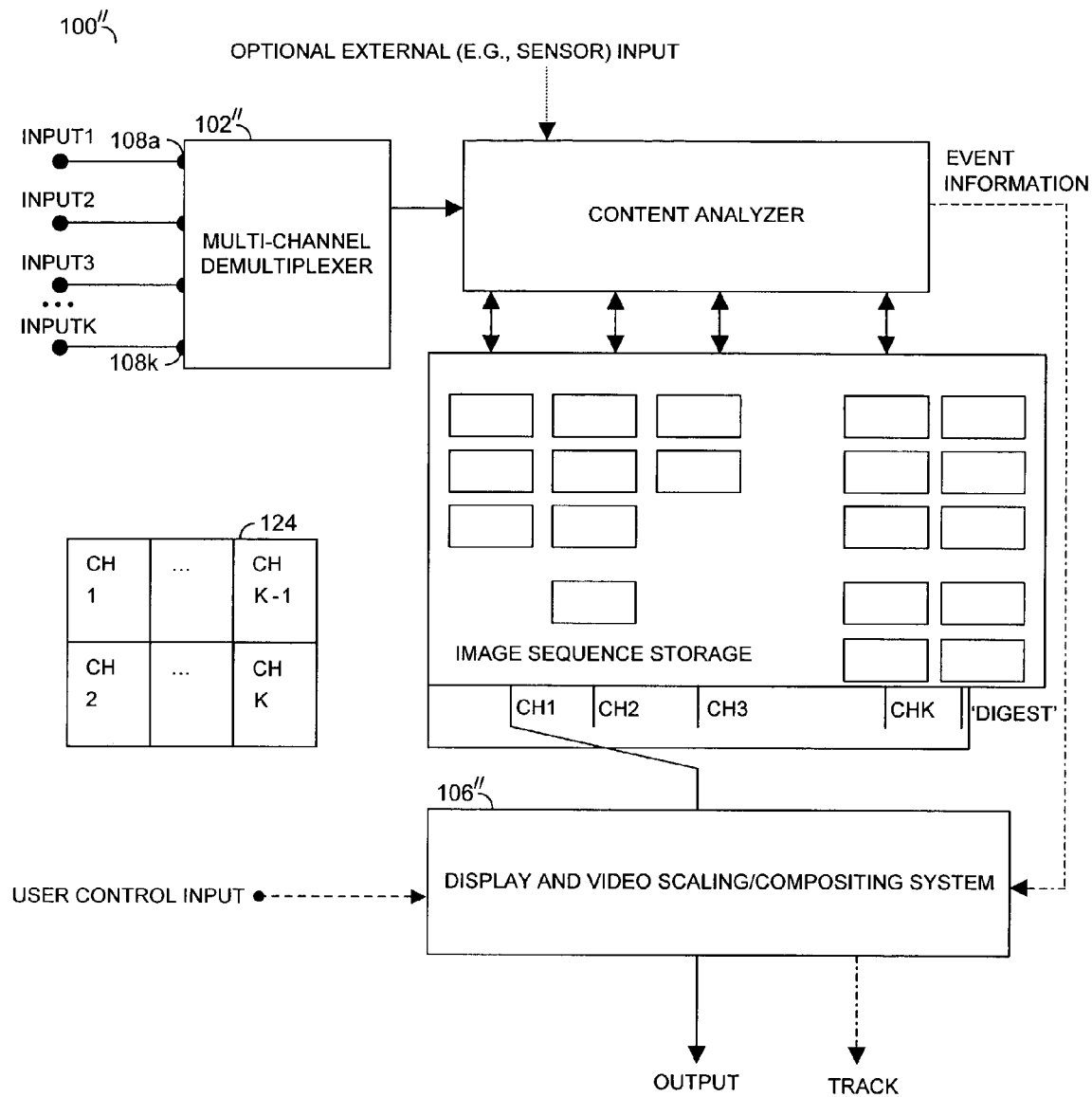
FIG. 6 is a diagram of a display side system.

Referring to FIG. 6, a circuit (or system) 100" is shown illustrating a display side system. The block (or circuit) 102" may be implemented as a multi-channel demultiplexer. While multiple inputs are shown, the input to the demultiplexer 102" may be received from either a single source or a multi input source. For storing multiple video channels onto a single video tape, for instance, only a single video input is needed. However, for systems with large numbers of video channels, multiple storage systems may be implemented. Channels stored on different tapes may be needed for playback time processing. The system 100" may be applied, for instance, in a situation where the output video is transmitted uncompressed and stored to one or more tape recording systems (e.g., VHS). Both capture side and playback side systems may be implemented either together or separately. In a capture side case, the system 100" provides all the processing described in the above claims.

The system 100" illustrates a multi-channel demulitplexer and display system with intelligent image sequence analyzer. The solid output line from the circuit 106" may be used for video for monitoring. The dashed output line may provide event information. An optional user input may be used to control the circuit 106". The circuit 106" may provide multiple output streams that may be presented to multiple destinations.

Figure 7:
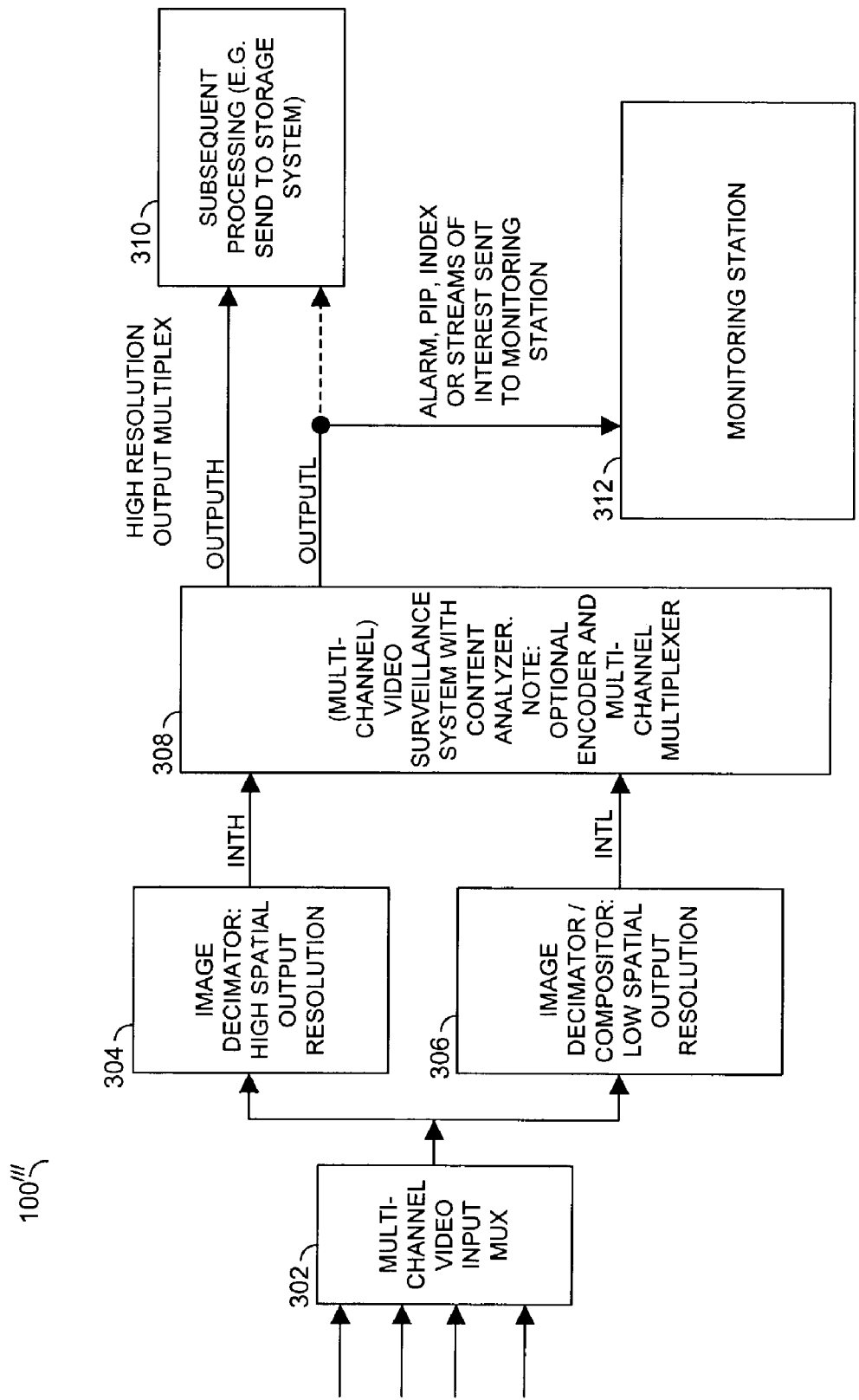
FIG. 7 is a diagram of a system implementing two output streams.

Referring to FIG. 7, a system 100'" illustrating a multistream surveillance system is shown. The system 100'" may provide support for heterogeneous processing of separate streams for monitoring and/or archiving. The system 100'" generally comprises the input section (or circuit) 302, a decimator section (or circuit) 304, a decimator/compositor section (or circuit) 306, an encoder section (or circuit) 308, a processing section (or circuit) 310 and a monitoring station (or display circuit) 312. The encoder section 308 generally comprises the storage section 104, the output section 106 and the multiplexer 120 as shown in FIG. 3. The storage section 104 may be adapted to receive two intermediate signals (e.g., INT1H and INT1L) substantially simultaneously.

The intermediate signal INT1 may be received by both the decimator section 304 and the decimator/compositor section 306. The decimator section 304 may be operational to generate the signal INT1H from an intermediate signal INT1 presented by the input section 302. The signal INT1H may be a high spatial output resolution video signal. The decimator/compositor section 306 may be operational to generate the signal INT1L from the intermediate signal INT1. The signal INT1L may be a low spatial output resolution video signal, relative to the signal INT1H. The signal INT1L may be a time-multiplexed stream of each input video signal INPUT1-INPUTk. The signal INT1L may include a composite, picture-in-picture, index and/or similar stream having decimated pictures from several of the input video signals INPUT1-INPUTk.

Generation of the high-resolution signal INT1H may involve horizontal decimation, vertical decimation, temporal decimation, or no decimation at all. Similarly, generation of the low resolution signal INT1L may be achieved using any of the above decimation methods. The low resolution signal INT1L may also be a digest of lower resolution pictures from the other input video signals INPUT1-INPUTk. In one embodiment, several input video signals INPUT may be (i) decimated by ½ both horizontally and vertically, generating source input format (SIF) pictures and (ii) further decimated temporally to generate updated pictures on the order of once per second. The decimator section 145 may insert one or more still frames at a non-decimated and/or higher resolution into the high-resolution signal INT1H.

The encoder section 308 may be configured to receive, buffer, encode and multiplex each of the intermediate signals INT1H and INT1L. The multiplexer 120 within the encoder section 308 may generate multiple output video signals (e.g., OUTPUTH and OUTPUTL) from the encoded versions of the intermediate signals INT1H and INT1L, respectively. The output video signal OUTPUTH may have a spatial and/or temporal resolution higher than that of the output video signal OUTPUTL. The encoder section 148 is shown generating two output video signals OUTPUTH and OUTPUTL for diagrammatic simplicity, although (as shown in FIG. 2) a higher number of output video signals may be generated.

The output video signals OUTPUTH and OUTPUTL may be sent to different locations for further processing. In one embodiment, the output video signal OUTPUTH may be transferred to the processing section 310. The processing section 310 may be configured to perform additional operations on the output video signal OUTPUTH before forwarding to a subsequent section. For example, the subsequent section may be a storage system for archiving the high resolution output video signal OUTPUTH permitting later retrieval and analysis.

The output video signal OUTPUTL may be transferred to the monitoring station 312 for real-time viewing. The output video signal OUTPUTL may optionally be transferred to the processing section 310 (as indicated by the dashed arrow). Archiving the signal OUTPUTL may provide a way to quickly identify a reference time that a particular event was captured by one or more of the cameras. The reference time may then provide a starting point for viewing the appropriate high-resolution picture or pictures.

One stream may be implemented for archiving and subsequent retrieval and another stream may be implemented for live monitoring. The content analyzer (107 in FIG. 3) is generally engaged to adapt the streams sent to the monitoring station in response to the content being acquired and other optional external data inputs (e.g., sensor input indicating a door has opened) Illustratively, this system may be implemented to send only the digest stream if no interesting content is present, but switch to the camera of interest when motion is detected. Alternatively, the digest stream may be highlighted or the system bandwidth to the monitoring station increased and some or all cameras sent to the monitoring station (312). Additionally, audio or other electronic signals may be generated.

The monitoring circuit 312 may be located at a remote location. An example is the case where the recording system (tape, disk, etc.) is local, but provides access to a remote location. The surveillance system, as an example, could have a telephone modem. The system 100'" may respond to an alarm to 'call out' to the monitoring station 312 and send a digital signal (motion detected). Alternatively, the system 100'" may send video data at appropriate spatial and/or temporal resolution. If compression is available, the system 100" may send the digital signal compressed at the appropriate bit rate. In one example, a wireless, DSL, cable modem, or other high speed data connection may be implemented.

The content analyzer in the encoder circuit 308 may control the parameters of the stream sent to the monitoring station 312. Alarms or different video streams may be sent to the monitoring station 312. For example, in the absence of interesting content (e.g. motion), the monitoring station 312 may receive only the digest stream(s). When motion or an alarm is detected, however, some or all of the streams may be transmitted to the monitoring station 312.

Figure 8:
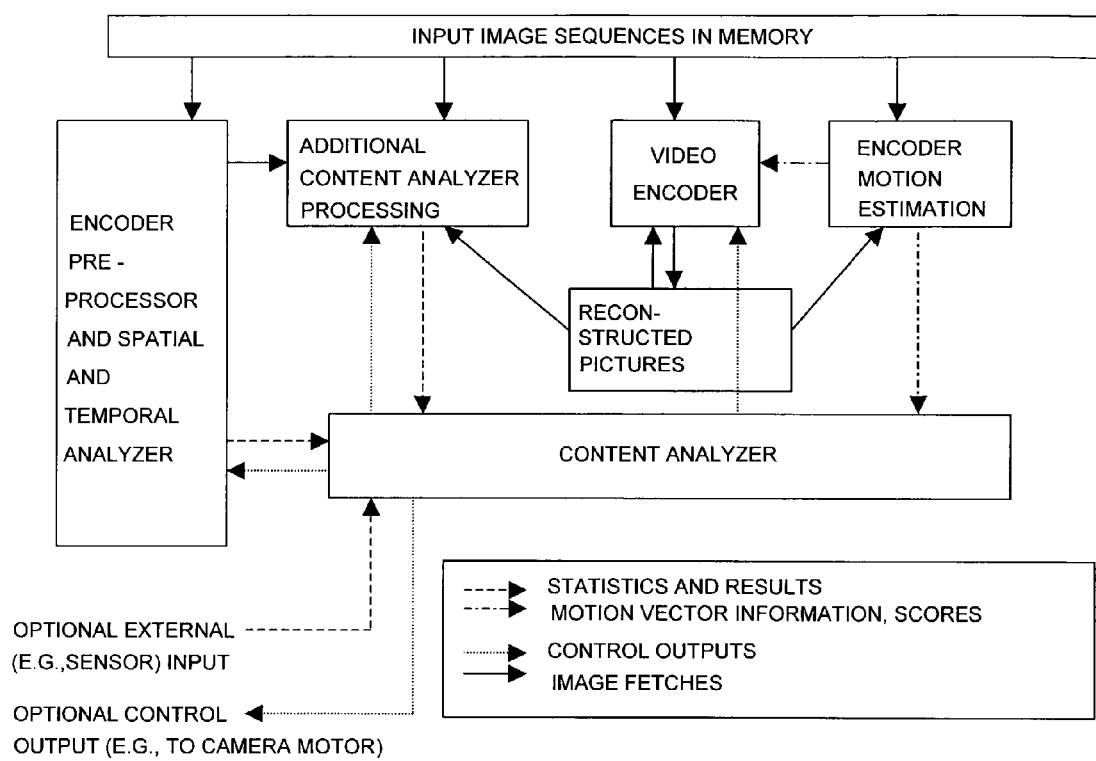
FIG. 8 is a diagram of a single channel implementation of the present invention.

Referring to FIG. 8, an example of a single channel processing operation is shown. The input multi-channel multiplexer of FIGS. 3 and 7 is omitted for simplicity. FIG. 8 illustrates the ability to add the content analyzer (and all the various benefits described) to a (multi-channel) surveillance system with little to no additional cost. All of the multi-stream multiplexer and multi-destination features described may be implemented, but have omitted for diagrammatic simplicity.

In one embodiment, the content analyzer may be implemented in software, taking results from the motion and temporal/spatial processors as well as external inputs, and controlling both the encoder system and pre-processing stages. The system 100'" may also implement optional compression in the block 308. FIG. 8 illustrates re-use of the image spatial/temporal analysis, motion estimation, and image storage units. Additional content may be integrated with pre-processing but is shown as a separate block in the diagram to illustrate that it is not limited to standard encoder temporal/spatial analysis.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
an input circuit configured to generate a first intermediate signal from a plurality of input video signals, wherein said first intermediate signal comprises an encoded digital video signal;
a content analyzer circuit configured to present one or more flags in response to said first intermediate signal;
a storage circuit configured to (i) store and organize said first intermediate signal into a plurality of sequences, each of said plurality of sequences corresponding to one of said input video signals and (ii) generate a second intermediate signal from said plurality of sequences; and
an output circuit configured to generate an output encoded bitstream in response to said second intermediate signal, wherein said output circuit is further configured to embed intra picture information into said output encoded bitstream in response to said one or more flags, wherein (i) said intra picture information allows said content analyzer circuit to generate said flags in response to temporal and spatial areas of interest in said encoded digital video signal, (ii) in a first mode, said content analyzer circuit (a) determines regions of greater interest and regions of lesser interest within a given channel, and (b) applies a first type of processing to said regions of greater interest comprising two or more frames and a second type of processing to said regions of lesser interest comprising two or more frames, wherein said two or more frames of said regions of greater interest and said two or more frames of said regions of lesser interest are permanently stored by said storage circuit after said first type of processing is applied to said regions of greater interest and said second type of processing is applied to said regions of lesser interest, and (iii) in a second mode, said content analyzer circuit applies said second type of processing to all frames within said given channel and said storage circuit permanently stores all of said frames of said given channel after said second type of processing is applied.

2. The apparatus according to claim 1, wherein said content analyzer circuit (i) discriminates between sequences of greater interest and sequences of lesser interest and (ii) presents the result of said discrimination to said output circuit in said one or more flags.

3. The apparatus according to claim 2, wherein said content analyzer independently changes a recording frame rate for reach of said plurality of sequences according to the result of the discrimination.

4. The apparatus according to claim 2, wherein said content analyzer enforces a minimum frame rate for storing each of said sequences.

5. The apparatus according to claim 1, wherein said plurality of sequences comprise channels of greater interest and channels of lesser interest, wherein said channels of greater interest are stored using a higher bit rate than said channels of lesser interest.

6. The apparatus according to claim 1, wherein said output circuit generates specific audio, video, control, or recording actions based on said one or more flags.

7. The apparatus according to claim 6, wherein one of said actions comprises an audio alert.

8. The apparatus according to claim 6, wherein one of said actions comprises generating a text message.

9. The apparatus according to claim 6, wherein one of said actions comprises generating a highlighted stream.

10. The apparatus according to claim 6, wherein one of said actions comprises bringing a stream of interest to the front of said output encoded bitstream.

11. The apparatus according to claim 6, wherein one of said actions comprises displaying a full resolution image sequence.

12. The apparatus according to claim 6, wherein one of said actions comprises generating a data message to present to another processing or monitoring system.

13. The apparatus according to claim 6, wherein one of said actions comprises controlling a start, stop, pause or resume of said storing.

14. The apparatus according to claim 1, wherein said content analyzer determines one or more locations of interesting events within the sequences, wherein said locations are stored in a log.

15. The apparatus according to claim 14, wherein said one or more locations comprise a time stamp in a tape storage device.

16. The apparatus according to claim 14, wherein said one or more locations comprise a file offset in an optical, magnetic, or tape storage device.

17. The apparatus according to claim 14, wherein said one or more locations are generated in response to analysis of the content of said first intermediate signal.

18. The apparatus according to claim 14, wherein said one or more locations are generated in response to other inputs to the system.

19. The apparatus according to claim 14, wherein said log is transmitted along with the output encoded bitstream.

20. The apparatus according to claim 14, wherein the storage circuit is augmented by the log to facilitate retrieval.

21. The apparatus according to claim 1, wherein said content analyzer circuit performs digital image enhancement on said regions of greater interest.

22. The apparatus according to claim 1, wherein said content analyzer circuit further tracks motion of said regions of greater interest.

23. The apparatus according to claim 1, wherein said content analyzer circuit issues information or control signals to a controller configured to steer a camera toward said regions of greater interest.

24. The apparatus according to claim 23, wherein said control signals are configured to control (i) zooming in or out, (ii) changes to brightness, (iii) changes to contrast, and (iv) edge enhancement settings.

25. The apparatus according to claim 23, wherein said control signals are configured to acquire the regions of greater interest with better temporal and/or spatial resolution.

26. The apparatus according to claim 1, wherein said flags are configured to control one or more channels within the system (i) independently when in a first mode and (ii) simultaneously when in a second mode.

27. The apparatus according to claim 1, wherein said input video signals are processed in uncompressed form.

28. The apparatus according to claim 1, wherein said output circuit is configured to generate multiple output encoded bitstreams.

29. The apparatus according to claim 1, wherein said output circuit is configured to adapt the composition and contents of one or more of the output encoded bitstreams in response to said one or more flags.

30. The apparatus according to claim 29, wherein said output circuit is configured to send an embedded alarm in one or more of the output encoded bitstreams.

31. The apparatus according to claim 1, wherein said output circuit is configured to generate one or more second output encoded bitstreams only in response to said one or more flags.

32. The apparatus according to claim 31, wherein one or more of said output encoded bitstreams is augmented by additional external data.

33. The apparatus according to claim 1, wherein said output encoded bitstream comprises a first one or more of output encoded bitstreams that are compressed and a second one or more encoded bitstreams that are uncompressed.

34. The apparatus according to claim 1, wherein said content analyzer circuit includes a video encoder configured to respond to (i) spatial and temporal filtering, (ii) spatial and temporal analysis, (iii) motion estimation, and (iv) motion compensation.

35. The apparatus according to claim 1, wherein said apparatus (i) presents index, information for viewing by a monitoring station and (ii) stores said output encoded bitstream in a data storage system.

36. The apparatus according to claim 1, wherein said flags are stored separately from said plurality of sequences.

37. The apparatus according to claim 1, wherein (i) a first set of said plurality of sequences is stored locally and (ii) a second set of said plurality of sequences is stored remotely.

38. The apparatus according to claim 1, wherein said storage circuit is further configured to (i) allocate a plurality of buffers such that each of said plurality of buffers corresponds to a respective one of said plurality of sequences and (ii) set a storage capacity of each buffer based on one or more parameters associated with the video input signal corresponding to the respective sequence.

39. An apparatus comprising:
a content analyzer circuit configured to present one or more flags in response to a plurality of input video signals;
a storage circuit configured to store said plurality of input video signals; and
an output circuit configured to generate a plurality of output encoded bitstreams in response to said stored input video signals, wherein said output circuit is further configured to embed intra picture information into said output encoded bitstreams in response to said one or more flags, wherein (i) said intra picture information allows said content analyzer circuit to generate said one or more flags in response to temporal and spatial areas of interest in said plurality of input video signals, (ii) in a first mode, said content analyzer circuit (a) determines regions of greater interest and regions of lesser interest within a given channel, (b) applies a first type of processing to said regions of greater interest comprising two or more frames and a second type of processing to said regions of lesser interest comprising two or more frames, wherein said two or more frames of said regions of greater interest and said two or more frames of said regions of lesser interest are permanently stored by said storage circuit after said first type of processing is applied to said regions of greater interest and said second type of processing is applied to said regions of lesser interest, and (iii) in a second mode, said content analyzer circuit applies said second type of processing to all frames within said given channel and said storage circuit permanently stores all of said frames of said given channel after said second type of processing is applied.

40. An apparatus for analyzing the content of a surveillance image comprising the steps of:
(A) generating a first intermediate signal from a plurality of input video signals;
(B) presenting one or more flags in response to an analysis of said intermediate signal;
(C) storing said first intermediate signal into a plurality of sequences each of said plurality of sequences corresponding to one of said input video signals;
(D) generating a second intermediate signal from said plurality of sequences; and
(E) generating an output encoded bitstream in response to said second intermediate signal, wherein intra picture information is embedded into said output encoded bitstream in response to said one or more flags, wherein (i) said intra picture information allows a content analyzer circuit to generate said one or more flags in response to temporal and spatial areas of interest in said intermediate signal, (ii) in a first mode, said content analyzer circuit (a) determines regions of greater interest and regions of lesser interest within a given channel, (b) applies a first type of processing to said regions of greater interest comprising two or more frames and a second type of processing to said regions of lesser interest comprising two or more frames, wherein said two or more frames of said regions of greater interest and said two or more frames of said regions of lesser interest are permanently stored by said storage circuit after said first type of processing is applied to said regions of greater interest and said second type of processing is applied to said regions of lesser interest, and (iii) in a second mode, said content analyzer circuit applies said second type of processing to all frames within said given channel and said storage circuit permanently stores all of said frames of said given channel after said second type of processing is applied.

* * * * *